United States Patent [19]

Csutor et al.

[11] 4,104,690

[45] Aug. 1, 1978

[54] ARRANGEMENT FOR RECEIVING CONTACT POTENTIAL RESPONSIVE SWITCHING DEVICES

[76] Inventors: Endre Csutor, Hochstein 5, Ludenscheid, Fed. Rep. of Germany, 588; Leo Mittler, Beethovenstr. 9, Meinerzhagen, Fed. Rep. of Germany, 5892; Rudolf Wörtche, Parkstr. 155c, Ludenscheid, Fed. Rep. of Germany, 588

[21] Appl. No.: 732,401

[22] Filed: Oct. 12, 1976

[30] Foreign Application Priority Data

Oct. 18, 1975 [DE] Fed. Rep. of Germany ....... 2546868

[51] Int. Cl.[2] .............................................. H02B 3/28

[52] U.S. Cl. .................................... 361/45; 200/51 R

[58] Field of Search .............. 310/71; 339/18 P, 31 R, 339/31 M, 32 R, 32 M, 33; 200/51 R, 51.02, 51.03, 51.04, 51.05, 51.06, 51.07, 51.08; 361/45, 331, 332, 334, 335

[56] References Cited

U.S. PATENT DOCUMENTS

| | | | |
|---|---|---|---|
| 1,508,765 | 9/1924 | Benjamin | 200/51.02 |
| 1,635,312 | 7/1927 | Diehl | 339/31 M |
| 1,669,120 | 5/1928 | De Reamer | 200/51 R |
| 1,976,779 | 10/1934 | Grant et al. | 200/51 R X |
| 2,938,192 | 5/1960 | Kobryner et al. | 339/32 R |
| 2,957,156 | 10/1960 | Gatto et al. | 339/31 R |
| 3,092,430 | 6/1963 | Miller | 339/32 R |
| 3,150,230 | 9/1964 | Goodman | 339/32 R |
| 3,163,728 | 12/1964 | Martin | 200/51 R X |
| 3,532,846 | 10/1970 | Schumacher | 339/33 R |

*Primary Examiner*—Thomas J. Kozma

*Attorney, Agent, or Firm*—Erwin Salzer

[57] ABSTRACT

This invention relates to an arrangement of contact potential responsive switching devices.

According to this invention the contact voltage responsive switch and the outlet may either be combined into a unit, or the switch and an outlet may be arranged at different locations, or the switch may be combined with the outlet into a unit, and one or more outlets positioned at different locations all of which are controlled by the switch may be added.

5 Claims, 15 Drawing Figures

ARRANGEMENT FOR RECEIVING CONTACT POTENTIAL RESPONSIVE SWITCHING DEVICES

BACKGROUND OF THE INVENTION

This invention relates to arrangements for receiving contact potential responsive switching devices, and more particularly to the combination of contact potential responsive circuit breakers and electric outlets. It is known to combine contact potential responsive switching devices and electric outlets into units. The applicability of these prior art devices is, however, a relatively limited one. This invention provides a more generally applicable combination of contact potential responsive switching devices and electric outlets.

SUMMARY OF THE INVENTION

A potential responsive switching device according to this invention includes a switching device socket supporting the constituent parts of a contact potential responsive switching device which are a plurality of relatively movable contacts, a latch mechanism for maintaining said contacts in the closed position thereof, a first operating member for manually operating said latch mechanism, a tripping coil responsive to the contact potential prevailing between ground and a load for automatically tripping said latch mechanism, a change-over switch for selectively connecting a phase-conductor over said tripping coil to ground, a first pair of terminals for connecting a power supply to some of said contacts, and a second pair of terminals for connecting others of said contacts to said load.

A switch according to this invention further includes a second pair of terminals conductively connected to a first pair of female contacts.

A receptacle body is arranged in front of said socket and affixed to said socket. Said receptacle body has a second pair of female contacts each conductively connected to a stab contact projecting beyond said receptacle body and cooperating with said first pair of female contacts. Said receptacle body further defines a pair of passageways of which one receives manual operating means for said latch mechanism and the other receives operating means for said change-over switch.

DESCRIPTION OF PREFERRED EMBODIMENTS

Figure 1:
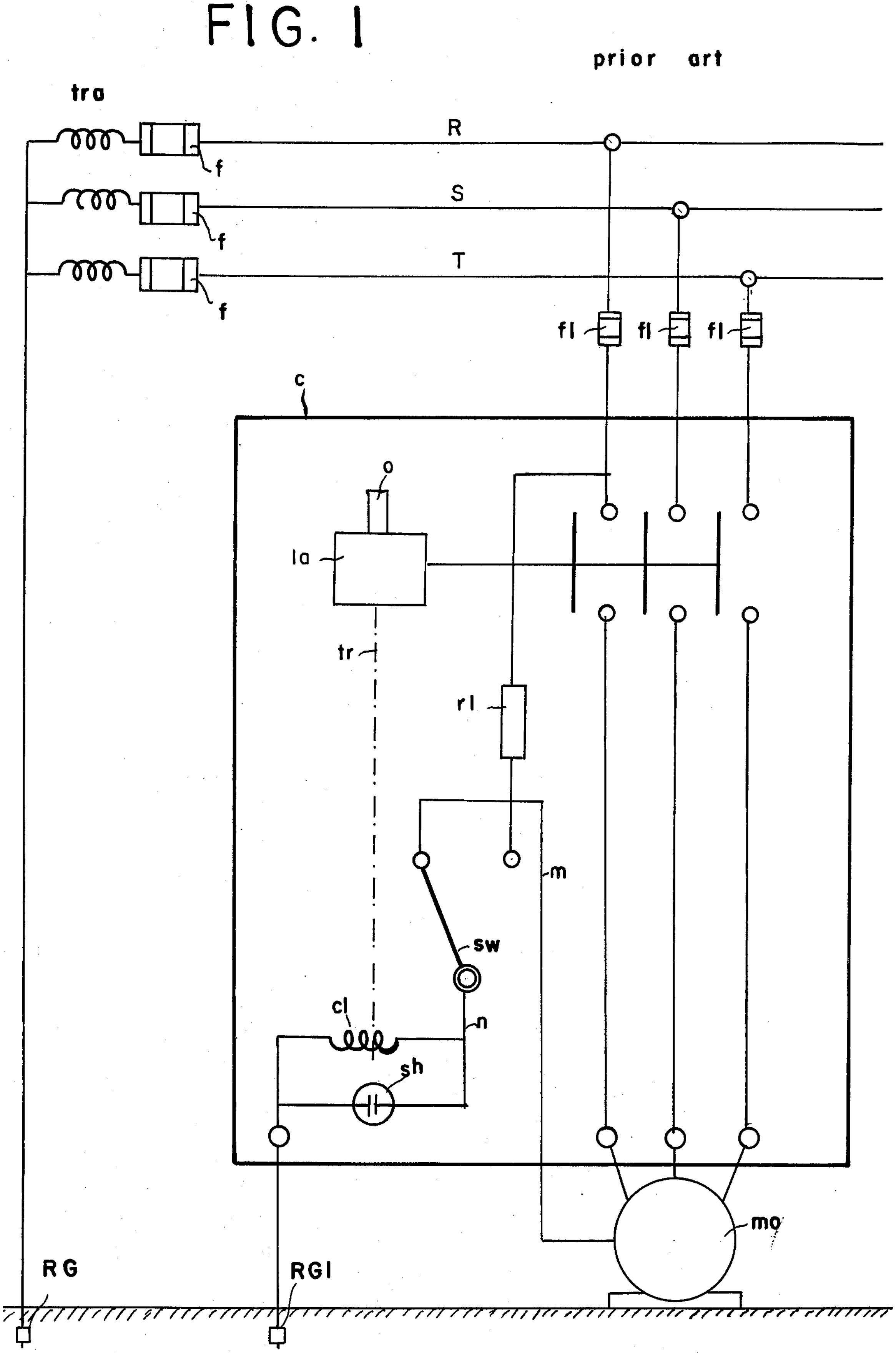
FIG. 1 is a diagrammatic representation of a contact potential responsive switching device.

Referring to FIG. 1, the three-phase motor mo is supplied from a three-phase network R,S,T via the contact potential responsive circuit breaker *c*. A lead *m* connects the frame of motor mo with the coil *c*1 of breaker *c* and the latter is connected by lead *n* to ground. The letters RG and RG1 indicate the resistance of the ground and the letter *r*1 indicates a test resistance. Normally the contacts of the breaker *c* are closed. When the frame of motor mo receives a non-permissible contact potential, coil *c*1 is energized and operates the switching mechanism or switch lock 1*a* by way of transmission member *tr*, which results in automatic opening of the breaker *c*. The operating mechanism 1*a* may also be closed manually by actuating push button *o* which, in turn, operates the mechanism 1*a* of the breaker *c*. The resistor *r*1 connected to phase R may be connected by means of auxiliary testing switch sw to the coil *c*1. This impresses a dangerous voltage on coil *c*1, resulting in opening of the breaker or switching device *c* by way of *tr* and 1*a*. Thus the purpose of resistor *r*1 and switch sw is to test whether the contact voltage responsive switch *c* is operative. Coil *c*1 is shunted by a glow lamp *sh*, or the like, allowing excessive voltages to discharge to ground. Tra indicates the secondary of a transformer and *f* and *f*1 are fuses.

Figure 1A:
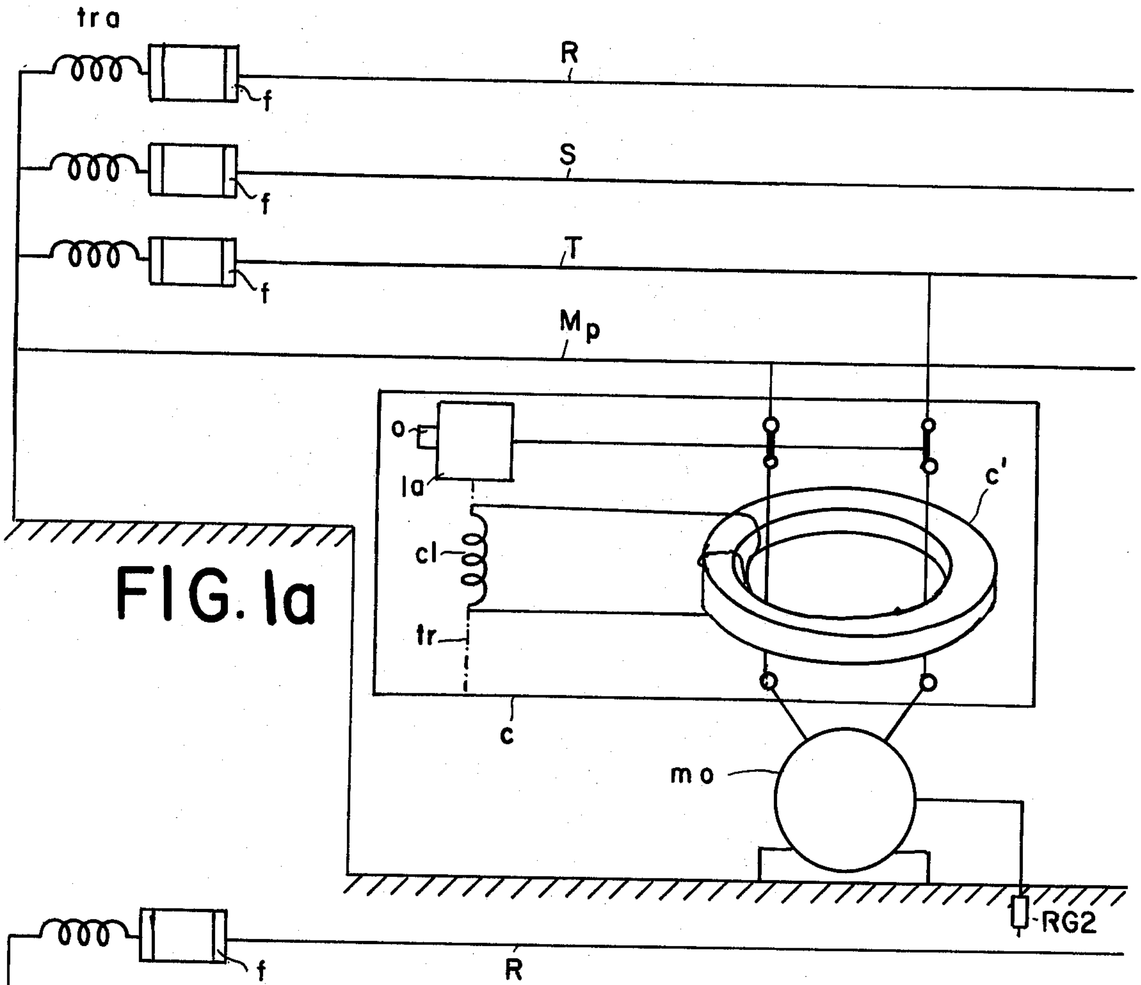
FIGS. 1*a* and 1*b* are diagrammatic representations of other prior art contact potential responsive switching devices.
Figure 1B:
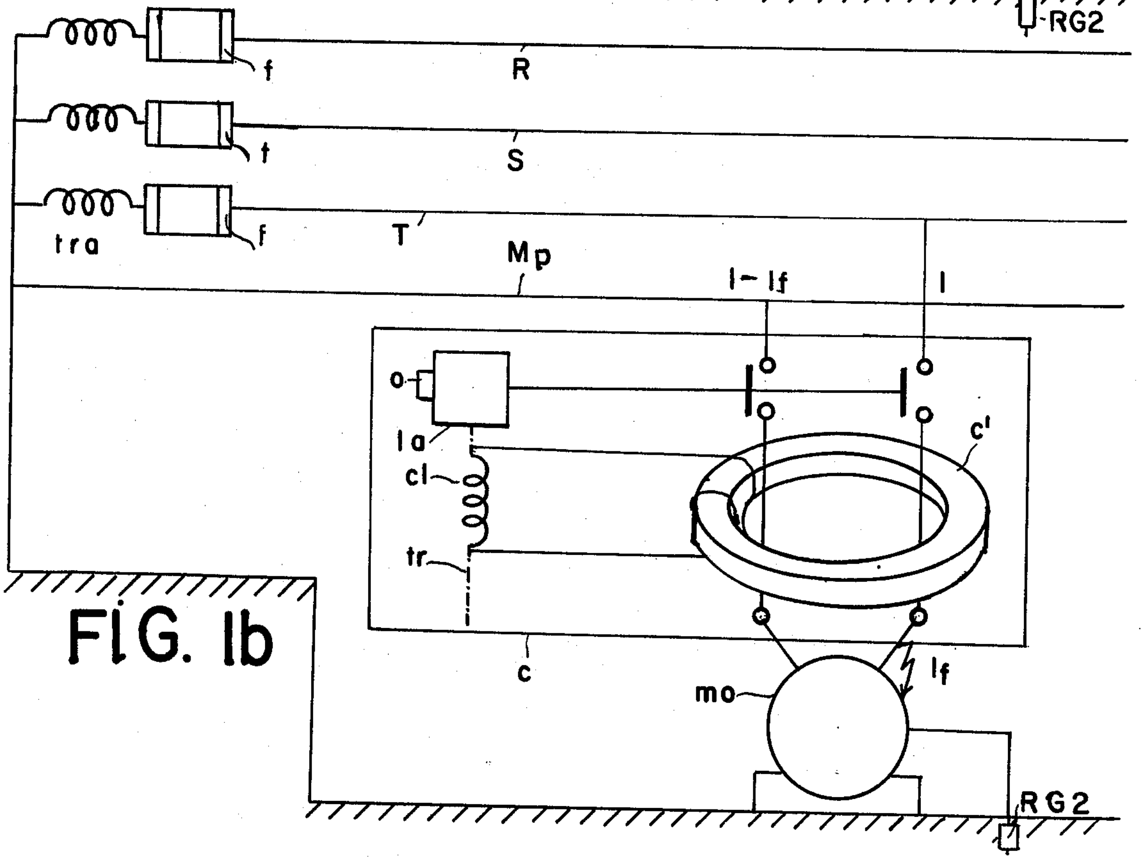
Figure 1C:
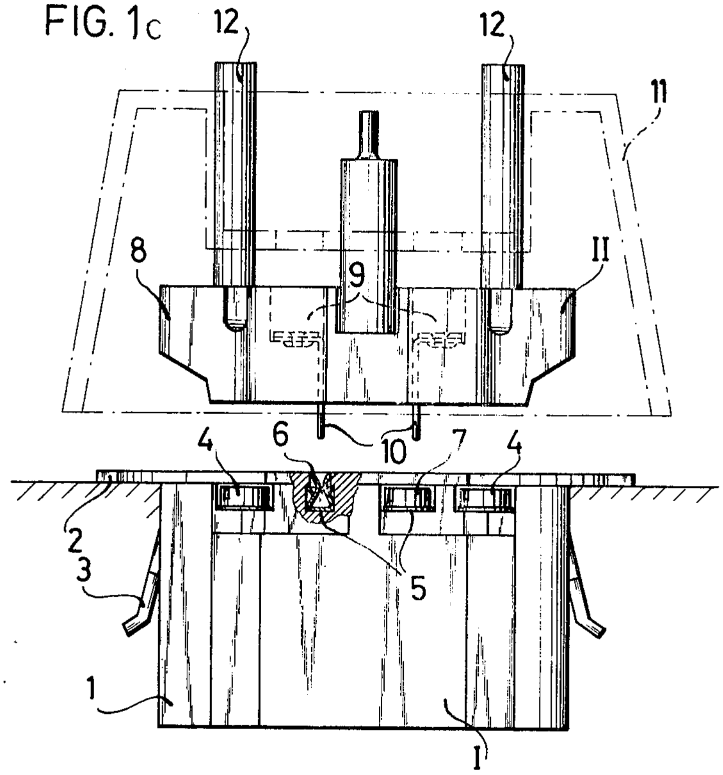
FIG. 1*c* shows partly in side elevation and partly in section a combined contact potential responsive switching device and an electrical outlet mounted in front thereof and forming a unit with the same.
Figure 2:
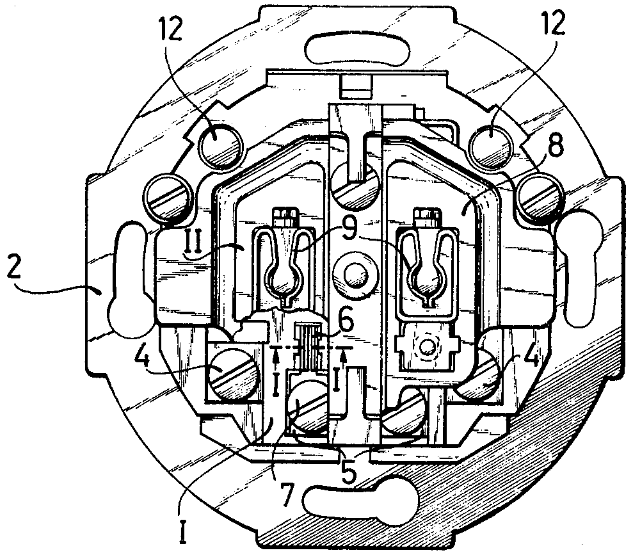
FIG. 2 shows the structure of FIG. 1 in an end view.

Referring now to FIGS. 1*a* and 1*b*, both of these figures show another switch mechanism adapted to control contact potentials resulting from insulation faults. FIG. 1*a* shows the breaker in faultless condition and FIG. 1*b* shows the breaker upon occurrence of a fault. The same reference characters have been used in FIGS. 1, 1*a* and 1*b* to designate like parts. In FIGS. 1*a* and 1*b* switch *c* contains transformer *c′* connected to leads T and M*p* through which motor *mo* is energized. The latter is grounded and the resistance of grounding has been referred-to as RG2. As long as the insulation of the system is intact, no ground potential prevails on the frame of motor *mo*, the current flowing into motor *mo* is flowing out of motor *mo*. Hence, transformer *c′* and relay coil *c*1 remain unenergized and the linkage *tr* does not operate latching mechanism l*a*. If an insulation defect occurs in motor *mo*, a current flows through RG2 which current is $I_f$. If the input and output of the transformer *c′* are unequal, this energizes relay or coil *c*1 and the latter causes unlatching of breaker *c*.

Referring now to FIGS. 1*c* to 4, reference character I has been applied to indicate a compact device socket for receiving a contact responsive switching device as shown in FIG. 1 or in FIGS. 1*a* and 1*b*. Mounted on socket 1 is the outlet generally indicated by reference character II. To be more specific, socket or housing 1 contains the several parts shown in FIG. 1, or in FIGS. 1*a* and 1*b*. Housing 1 may be provided with a supporting collar 2 and with claw member 3 for installation inside of a recess of the wall. On the surface of the switch there are provided a pair of screw terminals 4 for the incoming leads and a pair of screw terminals 5 for the outgoing leads. The terminals 5 are provided with female contacts 6. Contacts 6, in turn, cooperate with the stabs 10 projecting from female contacts 9. Parts 9 and 10 are affixed to outlet II. The screw terminals 5 are further provided with a terminal 7 adapted to affix wire leads under pressure to them. This makes it possible to selectively mount upon device I either an outlet II, as shown in FIGS. 1c–4, or to arrange the outlet II on the side of device I, as shown in FIGS. 5–12.

The outlet II adapted to be mounted on housing I includes a socket 8 of insulating material supporting the female contacts 9 with their stabs 10 the ends of which project beyond the lower limit of outlet II and of a hood 11 which extends beyond the switching device I.

For the operation of switching device I two operators 12 are arranged on the side of socket 1 opposite terminals 4 and 5. One of operators 12 is for operation of the latch mechanism of the circuit breaker and corresponds to part *o* of FIG. 1, and the other of these operators 12 is for testing the operativeness of the breaker or switch and corresponds to the switch sw of FIG. 1. Operators 12 project through hood 11.

Figure 3:
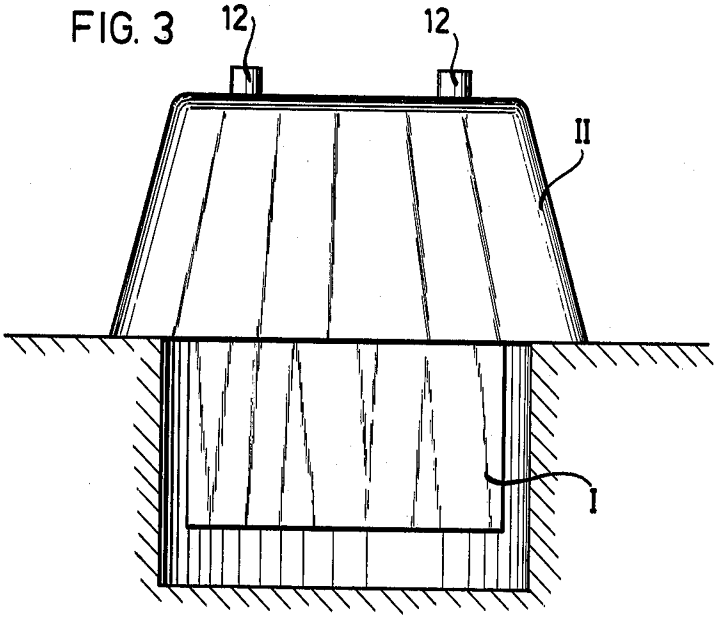
FIG. 3 shows the structure of FIG. 1 in side elevation.
Figure 4:
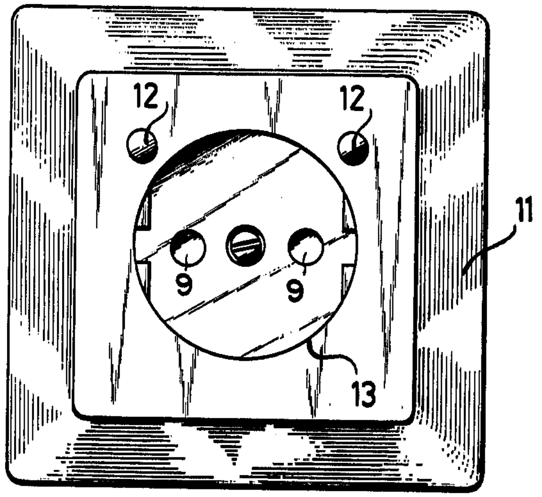
FIG. 4 shows the structure of FIG. 1 in front elevation.

FIGS. 3 and 4 show the above described structure in side and front elevation, both parts I and II thereof being united. FIGS. 3 and 4 show particularly well the arrangement of operators 12 At regions of the hood 11 not occupied by any other parts, i.e. adjacent to cut-out 13.

In FIGS. 5–12 the same reference characters as in FIGS. 1c–4 have been applied to indicate like parts.

Figure 5:
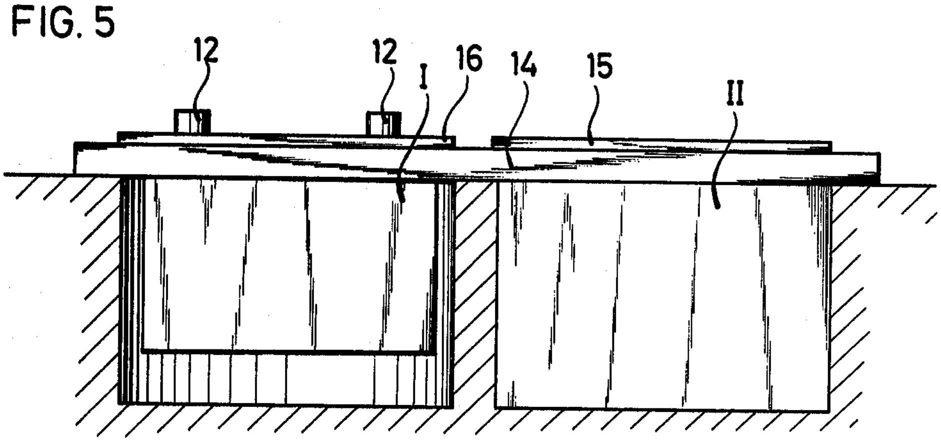
FIGS. 5 and 6 show an embodiment of the invention in side elevation and in top-plan view, respectively, wherein the outlet is not mounted on top, but arranged side by side with the switching device.
Figure 6:
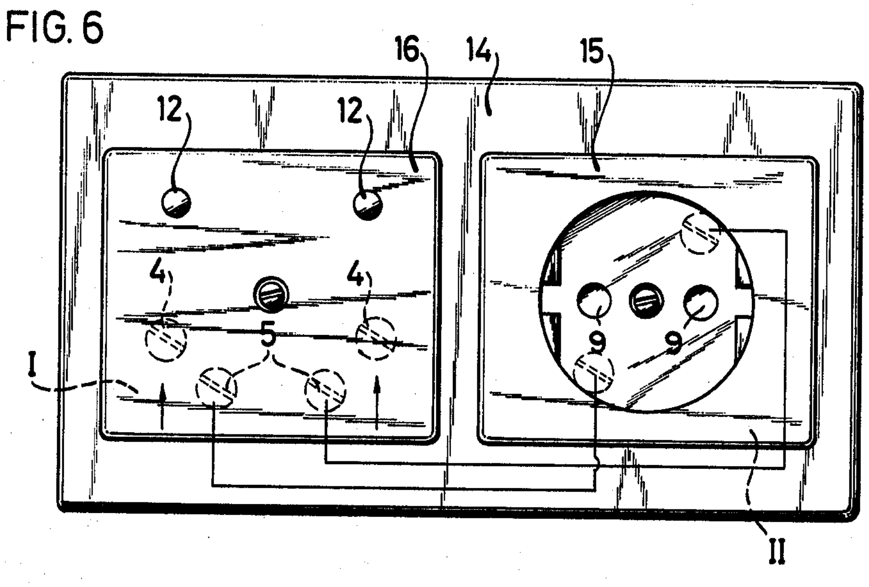

In FIGS. 5 and 6 the switching device I and the outlet II are two separate, flush-mounted units. They are mounted side by side in a recess of the wall covered by a common plate 14. The switching device I has an individual cover plate 16 and the outlet II has an individual cover plate 15. FIGS. 5 and 6 indicate also diagrammatically the electrical wire connections between switch I and outlet II. The operating and testing means 12 project through cover plate 16 of switching device I.

Figure 7:
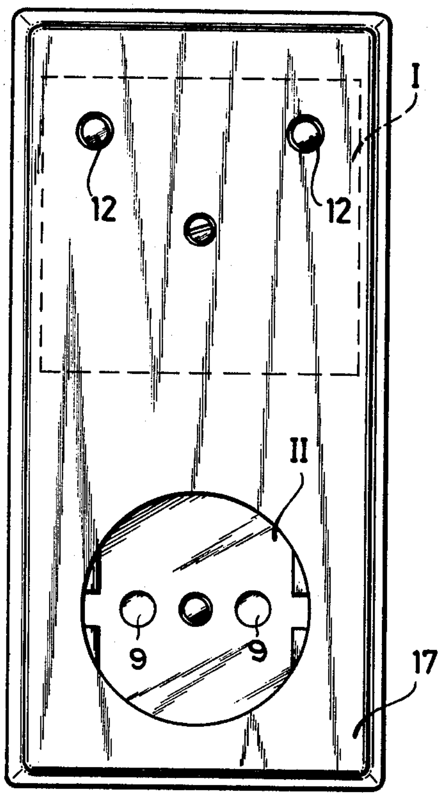
FIGS. 7 and 8 show another embodiment of the invention in elevation and in side view, respectively.
Figure 8:
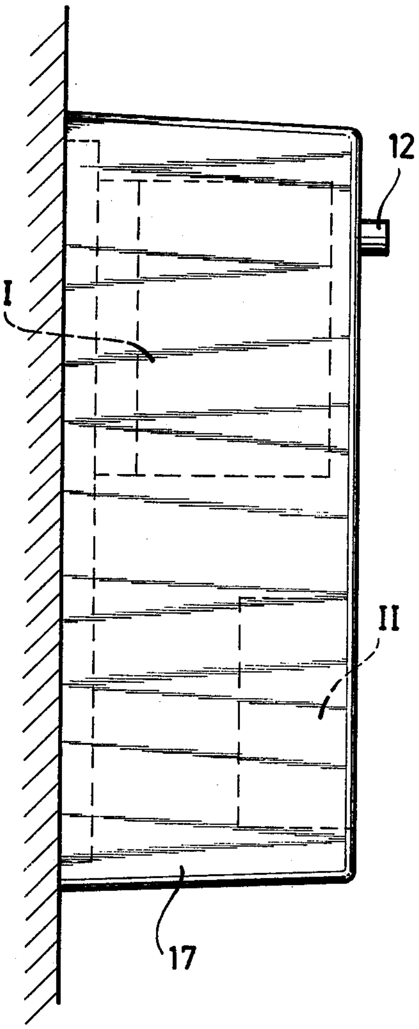

FIGS. 7 and 8 show another embodiment of the invention wherein the switching device I and the outlet II are arranged under a common hood 17 pierced by the two actuators 12.

Figure 9:
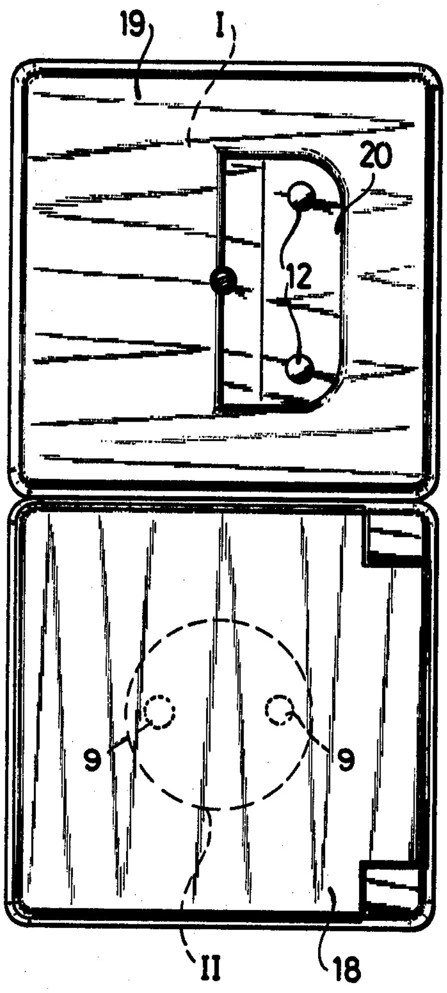
FIGS. 9 and 10 show still another embodiment of the invention in elevation and in side view, respectively.
Figure 10:
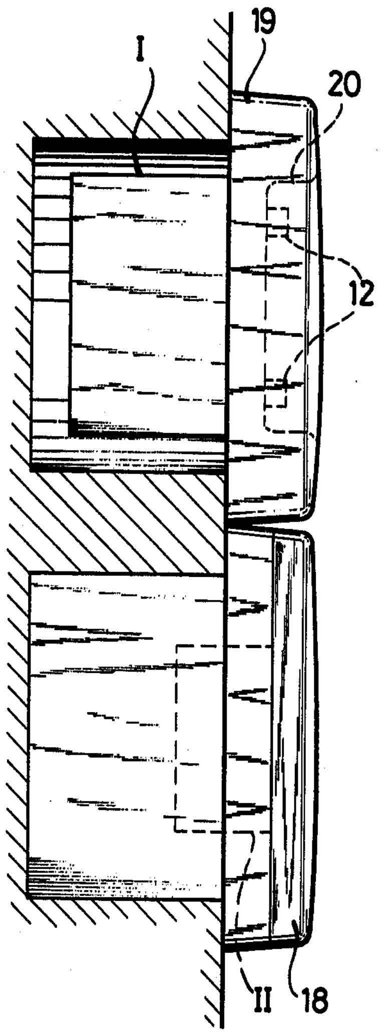

FIGS. 9 and 10 show a waterproof embodiment of the invention wherein the circuit breaker I and the outlet II are arranged side by side in separate recesses. The outlet of switching device I is covered by a watertight cover 19 having a recess 20 for the operating means 12 while the outlet II is provided with a watertight cover 18.

Figure 11:
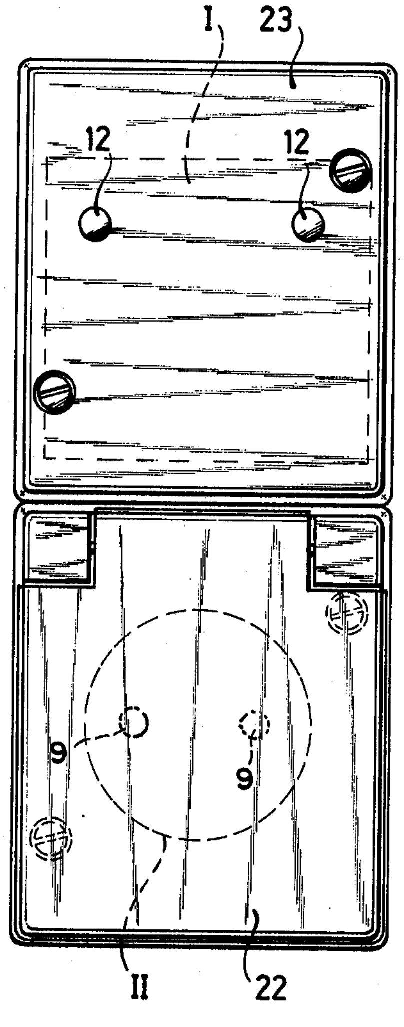
FIGS. 11 and 12 show a further embodiment of the invention in elevation and in side view, respectively.
Figure 12:
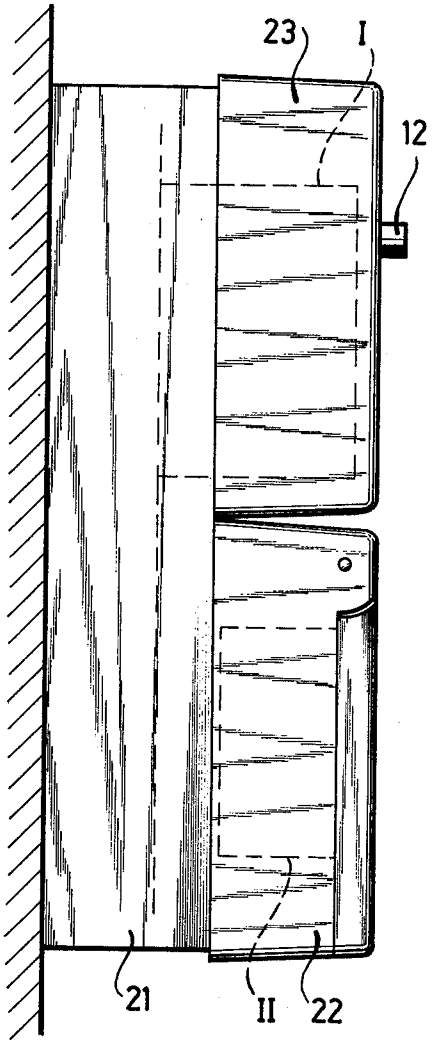

FIGS. 11 and 12 show a watertight embodiment wherein the switching device I and the outlet II are separate but have a common enclosure 21. The switching device I is covered by a first cover 23 through which two operating organs 12 project, while the outlet II is provided with a second and separate cover 22.

It will be apparent from the foregoing that the two terminals 6 and 7 which are both conneceted to terminals 5 make it possible to connect to terminals 5 either the stab contacts 10 of outlet contacts 9 mounted on part II in front of socket 1, or to connect to terminals 5 two wires by means of contacts 7. It will be also apparent that terminals 5 which are adapted to perform a dual connection further allow to connect several outlets II to the same switching device I, which several outlets are then connected in parallel and supervised by the same switching device I.

We claim as our invention:

1. An arrangement of a contact potential responsive switching device including (a) a switching device socket supporting the constituent parts of a contact potential responsive switching device which are a plurality of relatively movable contacts, a latch mechanism for maintaining said contacts in the closed position thereof, a first operating member for manually operating said latch mechanism, a tripping coil responsive to the contact potential prevailing between ground and a load for automatically tripping said latch mechanism, a change-over switch for selectively connecting a phase-conductor over said tripping coil to ground, a first pair of terminals for connecting a power supply to some of said contacts, a second pair of terminals for connecting others of said contacts to said load;

(b) said second pair of terminals being conductively connected to a first pair of female contacts;

(c) a receptacle body arranged in front of said socket and affixed to said socket, said receptacle body having a second pair of female contacts each conductively connected to a stab contact projecting beyond said receptacle body and cooperating with said first pair of female contacts, and said receptacle body further defining a pair of passageways of which one receives manual operating means for said latch mechanism and the other receives operating means for said change-over switch.

2. An arrangement of a contact potential responsive switching device according to claim 1 wherein said first pair of terminals, said second pair of terminals, said first pair of female contacts, said second pair of female contacts, and said pair of stab contacts are all arranged symmetrically about a common median plane of said switching device socket and of said receptacle body.

3. An arrangement as specified in claim 1 wherein the outlines of said socket and of said receptacle body define four quadrants of which one of the upper quadrants accommodates said operating means for manually operating said latch mechanism, of which the other of the upper quadrants accommodates said operating means for said change-over switch, of which one of the lower quadrants accommodates one of said first pair of terminals and one of said second pair of terminals, and of which the other of the lower quadrants accommodates the other of said first pair of terminals and the other of said secondpair of terminals.

4. An arrangement of a contact potential responsive switching device as specified in claim 3 comprising a hood covering said socket and said receptacle body and having perforations for the passage of operating means of said latch mechanism and for the passage of operating means for said change-over switch to the front surface of said hood.

5. A contact potential responsive switch comprising (a) a socket;

(b) said socket supporting relatively movable contacts, a latch mechanism for maintaining said contacts in the closed position thereof, a first operating member for operating said latch mechanism manually, a tripping coil responsive to a contact potential between ground and a load for automatically trippings said latch mechanism, a change-over switch for selectively connecting said load over said tripping coil to ground and for connecting a phase conductor over said tripping coil to ground, a pair of wire input terminals on said socket adapted to connect a source of power to some of said relatively movable contacts, a pair of wire output terminals on said socket adapted to connect others of said relatively movable contacts to said load, a first pair of female contacts on said socket each conductively connected to one of said output terminals thereof; and (c) an outlet body arranged above and affixed to said socket, said outlet body having a second pair of female contacts conductively connected to a pair of stab contacts projecting beyond said outlet body and arranged in registry with said first pair of female contacts on said socket so as to engage said first pair of female contacts on said socket, and said outlet body further defining a pair of passageways for the passage of a pair of auxiliary operating members through said outlet body, one of said auxiliary operating members being adapted to operate said first operating member on said socket, and the other of said auxiliary operating members being adapted to operate said change-over switch on said socket.

* * * * *